May 6, 1969  E. A. HORVATH ET AL  3,442,559

TAKE-UP BEARING SUPPORT

Filed March 14, 1966

INVENTORS
ERNEST A. HORVATH
LEO T. JOYAL

BY  *M. A. Hobbs*

ATTORNEY

United States Patent Office 3,442,559
Patented May 6, 1969

3,442,559
TAKE-UP BEARING SUPPORT
Ernest A. Horvath, South Bend, and Leo T. Joyal, Mishawaka, Ind., assignors to The Reliance Electric and Engineering Company, a corporation of Ohio
Filed Mar. 14, 1966, Ser. No. 534,102
Int. Cl. F16c 13/00, 39/00, 35/00
U.S. Cl. 308—15                              6 Claims

ABSTRACT OF THE DISCLOSURE

An adjustable bearing support for conveyors and the like in which an elongated base is connected to two upright end members by wedging the end members against shoulders at opposite ends of the base using a pin and tapered surface. The end members are connected by a rod above the base, which together with the base support a bearing movable longitudinally on the base for making an adjustment in the bearing assembly.

---

In the conventional conveyor belt installations of relatively large capacity, the end pulleys for the belts are mounted on shafts journalled in bearings adjustable independently of one another in the direction longitudinal with the belt. The bearings are adjusted initially to obtain the desired tension on the conveyor belt and they may be adjusted from time to time during the life of the belt to compensate for normal stretching of the belt and wearing of the conveyor components. The length of the take-up frame used in any particular installation depends primarily on the size of the belt and length of the conveyor, and with the exception of the frame, the parts which form the take-up bearing assemblies may be the same from one installation to another installation. In the past, the frames have been of one-piece rigid construction, thus requiring a different frame for each different conveyor installation. This has not only made handling and shipping difficult, but has required a relatively large inventory of complete frames in order to meet customer demands. It is therefore one of the principal objects of the present invention to provide a take-up frame and bearing assembly in which most of the parts thereof are interchangeable with the parts of other similar assemblies of different lengths and which can be easily and readily assembled into the final structure at the place where the conveyor is being installed without the use of any special tools or equipment.

Another object of the invention is to provide a take-up frame for conveyor pulley bearings, which consists of a few relatively simple parts so constructed and designed that they can be assembled to form a rigid structure, and which can be easily disassembled and parts thereof replaced or interchanged to adapt the structure to different installations and operating requirements.

Still another object is to provide a relatively simple and reliable take-up bearing frame of the aforesaid type which can easily be fabricated from standard materials and with conventional equipment, and which can be conveniently stored and shipped in relatively compact disassembled condition.

Additional objects and advantages of the invention will become apparent from the following description and accompanying drawing, wherein.

Figure 1:
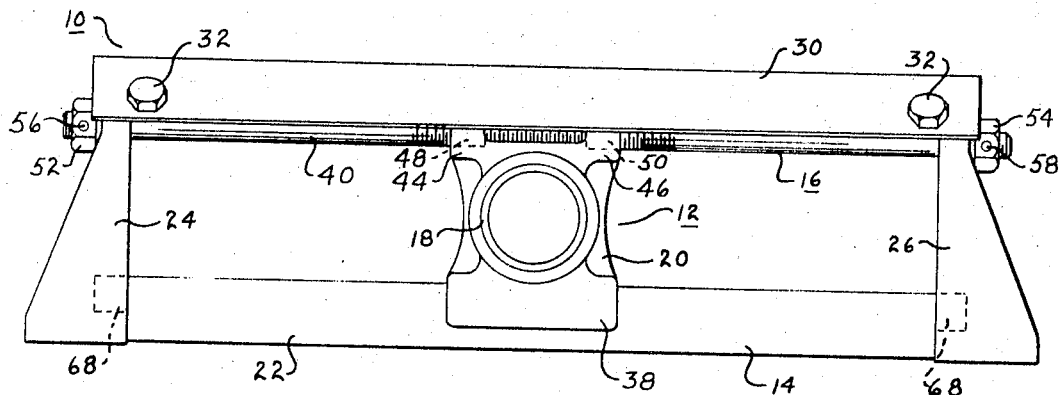
FIGURE 1 is a side elevational view of the present take-up bearing support.

Referring more specifically to the drawing, the type of take-up bearing support shown is used in pairs with one at each end of a conveyor pulley for supporting the ends of the shaft on which the conveyor pulley is mounted. With this arrangement, the conveyor pulley can be moved in one direction to lessen the tension on the conveyor belt and in the other direction to increase the belt tension. The present bearing support can be used with various types of conveyor belts and pulleys and with other equipment requiring this type of bearing adjustment. In the drawing, numeral 10 designates generally the present bearing support, 12 a bearing, 14 a frame for supporting a bearing, and 16 an adjustment mechanism for shifting the bearing to the right or left when the tension on the conveyor belt is increased or decreased. Bearing 12 may be of any suitable type, either babbitt, roller or ball bearing, the one shown being a babbitt type having a sleeve 18 and housing 20 with a bore for receiving sleeve 18.

Frame 14 consists of a base 22 and two end members 24 and 26 removably secured to the respective ends of base 22. The upper ends of the two end members are connected rigidly to one another by a steel angle member 30 bolted at each end to the respective end members by bolts 32 extending through the member and threadedly received in bores in lugs 34 on the upper inner edge of the end members. Base 22 is of a generally U-shaped configuration with curved bearing surface 36 on its upper external side for receiving and supporting bearing 12, which has a saddle-like construction 38 for seating on surface 36, including an inverted U-shaped structure with two opposed sides extending downwardly on each side of the base for retaining the bearing in proper alignment in the support. The upper end of the bearing is supported and adjusted by adjustment mechanism 16 consisting of a rod 40 threaded from end to end and extending through holes 42 in the respective end members and passing through holes in lugs 44 and 46 on the upper side of bearing housing 20. When mounted on base 22 and rod 40, the housing is adapted to move freely thereon as an adjustment in the position of the bearing is made. In the embodiment illustrated, holes 48 and 50 in lugs 44 and 46, respectively, are threaded to receive rod 40 which is retained in the holes in the end members by nuts 52 and 54 threaded onto the ends of the rod and held in adjusted position by pins 56 and 58, respectively, so that rod 40 will rotate with the nuts when an adjustment is being made, as will be explained more fully hereinafter.

Figures 2, 3:
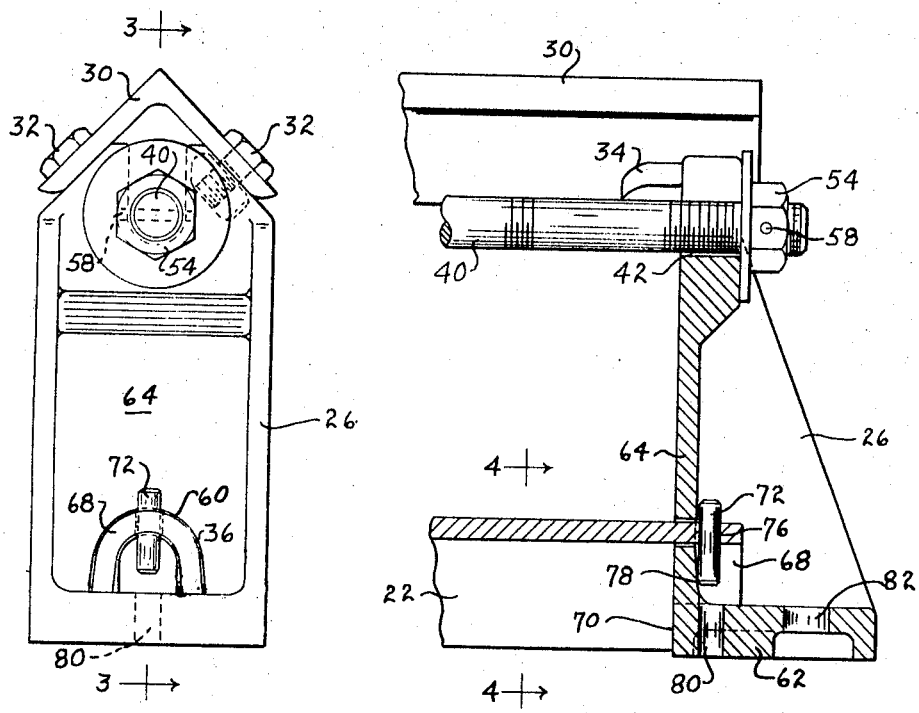
FIGURE 2 is an end elevational view of the bearing support shown in FIGURE 1.
FIGURE 3 is a fragmentary vertical cross sectional view of the bearing support shown in the preceding figures, the section being taken on line 3—3 of FIGURE 2.
Figure 4:
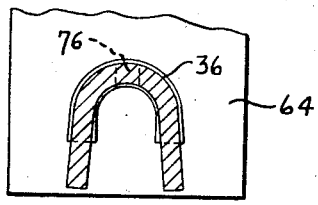
FIGURE 4 is a fragmentary partial cross sectional and elevational view, the section being taken on line 4—4 of FIGURE 3.

One of the primary features of the present take-up bearing support or frame consists in the structure for connecting the ends of base 22 to the respective end members, 24 and 26. Each end member is provided with an inverted U-shaped opening 60 extending upwardly from bottom 62 of the end member in the center of wall 64. An inverted U-shaped extension 68 on each end of base 22 slips through opening 60 until end 70 of the base seats firmly against the inner side of bottom 62. After extension 68 has been inserted in opening 60, a pin 72 is inserted in a hole 76 in the upper side of extension 68 on the side of wall 64 opposite the base, i.e. on the outer side of the wall. The outer side of the wall, i.e. the right hand side of wall 64 as viewed in FIGURE 3, is tapered outwardly and downwardly at portion 78 so that pin 72 will become wedged against the wall as it is pressed downwardly through hole 76, the lower end thereof engaging the outwardly tapered portion, thus drawing the end plate and the adjacent end of base 22 firmly together and holding the pin in place so that it will not become accidentally dislodged. A hole 80 is provided in bottom 62 directly beneath pin 72 to permit a tool to be inserted therein to engage the lower end of pin 72 for driving the pin from hole 76 in disassembling the frame 14. One of the particular advantages of the present frame construction is that different length bases may be used with the end member in different installations, avoiding the permanent, rigid frame structure and thus simplifying storage, shipping and handling. The entire bearing support may be secured to a bed or other support by bolts or studs extending through openings 82 in bottom 62 and nuts threaded thereon engaging the upper surface of the bottom.

When an installation is to be made, a base 22, screw 40 and member 30 of the desired length are selected, and end plates 24 and 26 are mounted on the end of base 22 by inserting extensions 68 through the respective openings 60 and seating pin 72 in hole 76 until it wedges firmly against tapered surface 78. After the pin has been properly seated in hole 76, the ends 70 of the base are held firmly against the lower part of the end members, and the lower side of each extension 68 is seated on the upper surface of bottom 62, thus forming a rigid, and in effect, unitary structure. The adjustment screw 40 is then inserted in holes 42 of the two end plates, and through threaded lugs 44 and 46 of the bearing housing, and nuts 52 and 54 are threaded onto the rod and pins 56 and 58 inserted through the respective nuts and rod. The upper member 30 is then secured firmly in place by bolts 32. After the present take-up bearing support has been assembled in the foregoing manner and the conveyor pulley shaft journalled in the two opposed bearings, an adjustment for increasing or decreasing the tension on the conveyor belt is made by rotating rods 40 of the respective bearing supports, causing the bearings to move longitudinally along base 22 of frame 14.

While only one embodiment of the present take-up bearing support has been described in detail herein, various changes and modifications may be made without departing from the scope of the invention.

We claim:

1. An adjustable bearing support comprising an elongated base having an extension at each end with a vertical hole therein and a laterally extending shoulder adjacent the inner end of each extension, end members at each end of said base, each end member having a rigid side wall with a hole therein receiving one of said extensions with the hole in the extension being outwardly from but adjacent to the outer surface of said wall, said outer surface having an outwardly tapered portion below the hole in said extension, a pin-like member seating in the hole of the extension and engaging said tapered portion for retaining the extension and the respective end member together with each shoulder seated on the respective end member, a threaded adjustment rod connecting said end members above said extensions and being parallel with but spaced from said base, a housed bearing mounted between and supported by said base and rod, and a threaded member on said rod for adjusting said bearing along said base and rod.

2. The adjustable bearing support as defined in claim 1, in which said elongated base and its extensions are of an inverted U-shaped configuration in cross section and the hole in the wall of each end member is of the same inverted U-shaped configuration receiving the respective extension.

3. The adjustable bearing support as defined in claim 2, in which the bottom of each end member is provided with a hole in substantial alignment with the pin when inserted in the hole in said extension to permit a tool to engage said pin to remove it from its securing position.

4. The adjustable bearing support as defined in claim 1, in which said threaded member on said rod consists of a lug joined integrally with said bearing housing.

5. The adjustable bearing support as defined in claim 1, in which a rigid member is secured to the top of each of said members and positioned parallel with said threaded adjustment rod.

6. The adjustable bearing support as defined in claim 2, in which a rigid member is secured to the top of each of said end members and positioned parallel with and directly over said threaded adjustment rod.

References Cited

UNITED STATES PATENTS

| | | | |
|---|---|---|---|
| 551,770 | 12/1895 | Johnson. | |
| 824,628 | 6/1906 | Curtis | 308—15 |
| 2,415,180 | 2/1947 | John | 287—56 |
| 2,640,567 | 6/1953 | Pressnall. | |
| 3,009,719 | 11/1961 | Otto. | |
| 3,300,237 | 1/1967 | Rolen. | |
| 1,778,231 | 10/1930 | Sjolander | 308—59 |
| 2,185,630 | 1/1940 | Fridlund. | |
| 2,791,474 | 5/1957 | Richard | 308—59 |
| 3,180,663 | 4/1965 | Lehmann | 287—56 X |

MARTIN P. SCHWADRON, *Primary Examiner.*

LUCIOUS L. JOHNSON, *Assistant Examiner.*

U.S. Cl. X.R.

287—54, 56; 308—31, 59